Aug. 31, 1948.    W. BAUMGARTNER    2,448,410
CALCULATING DEVICE
Filed Aug. 16, 1946    3 Sheets-Sheet 1
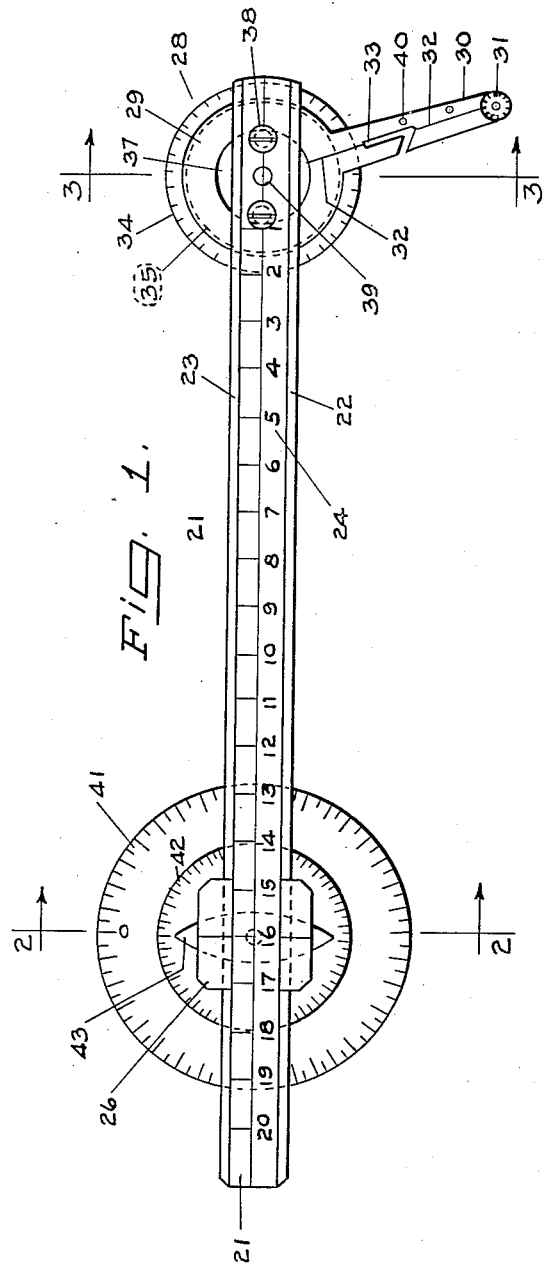
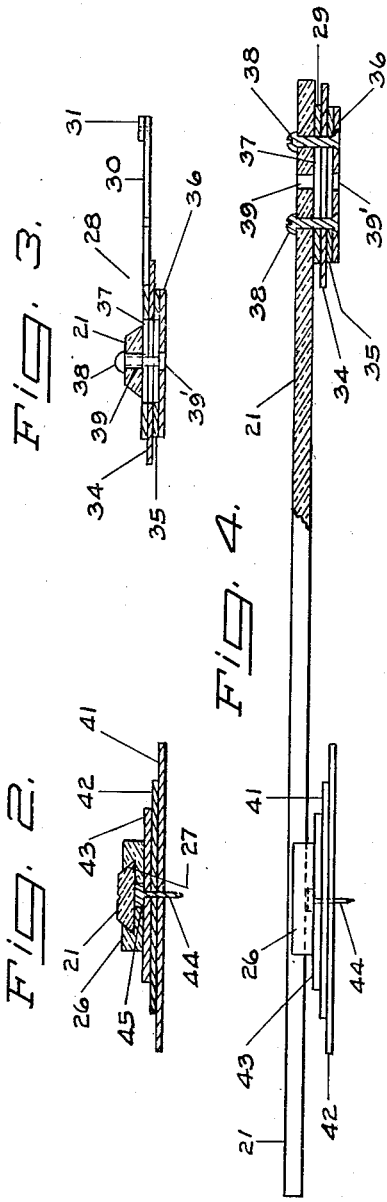
INVENTOR.
WALTER BAUMGARTNER
BY Edward C Healy
ATTORNEY

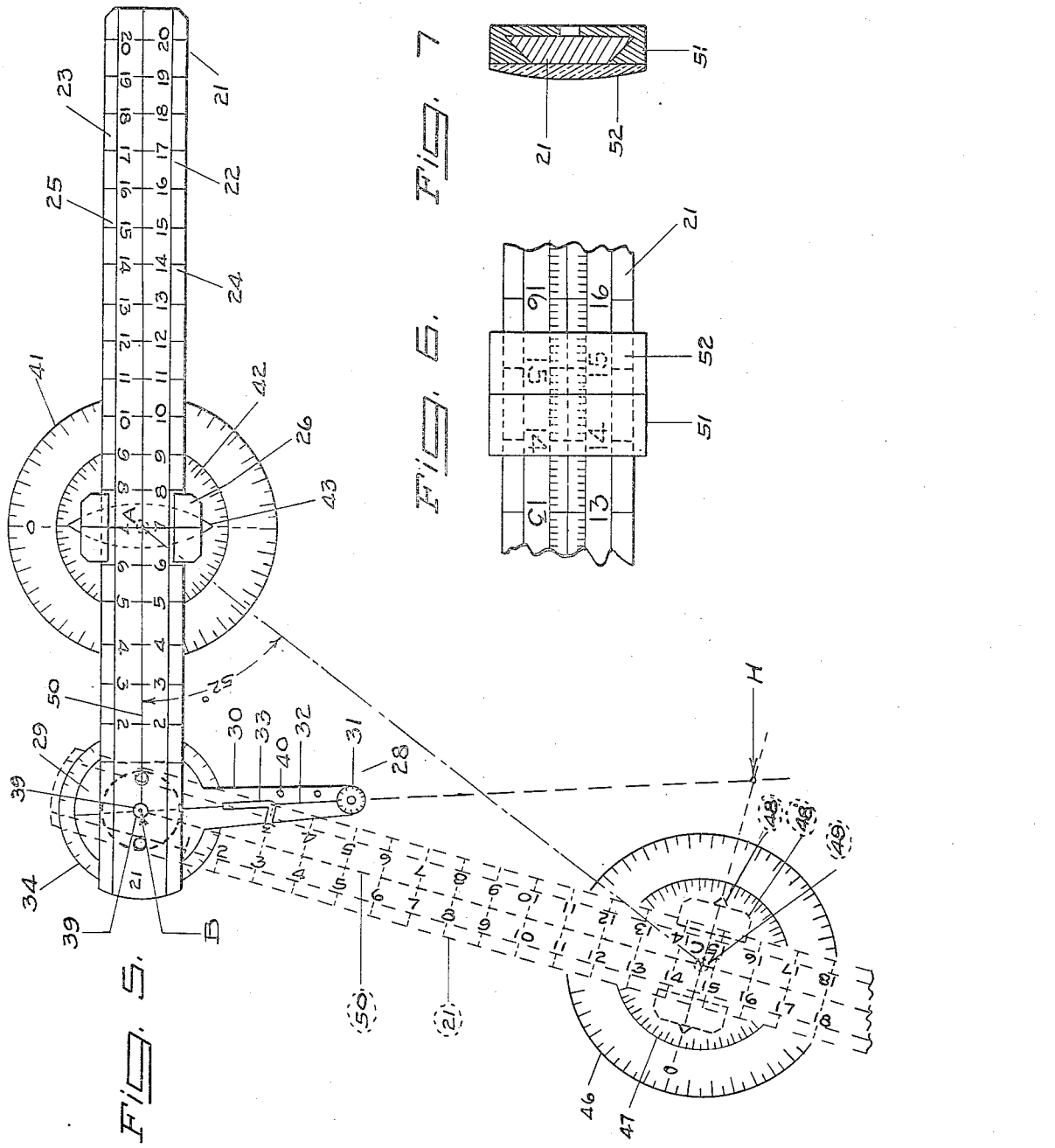

Aug. 31, 1948.     W. BAUMGARTNER     2,448,410
CALCULATING DEVICE
Filed Aug. 16, 1946     3 Sheets—Sheet 3
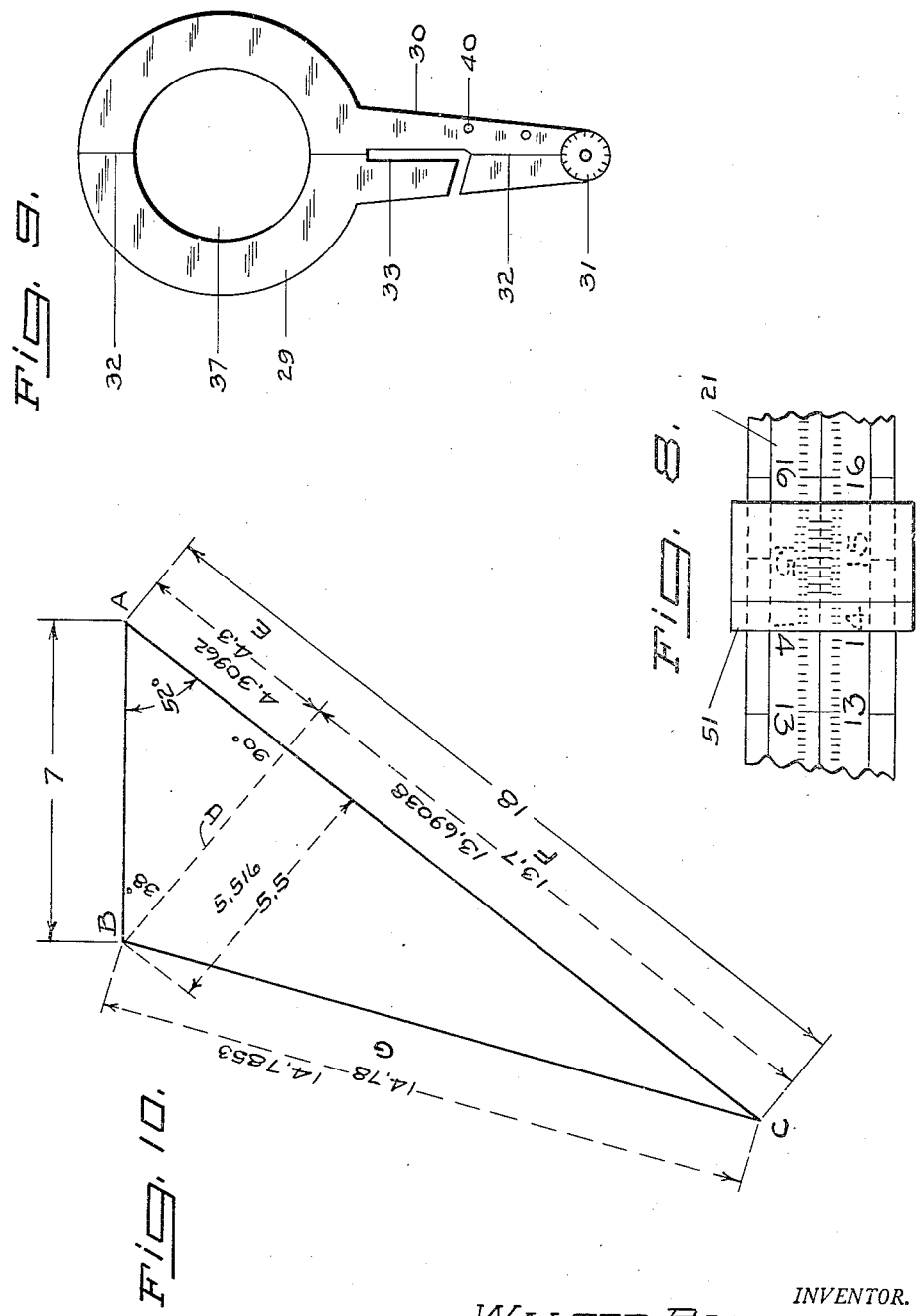
INVENTOR.
WALTER BAUMGARTNER
BY Edward C. Healy
ATTORNEY Patented Aug. 31, 1948

2,448,410

UNITED STATES PATENT OFFICE 2,448,410

CALCULATING DEVICE

Walter Baumgartner, Bellflower, Calif.

Application August 16, 1946, Serial No. 691,113

1 Claim. (Cl. 235—61)

This invention relates to an improved manually operative calculator and has particular reference to an especially constructed device that is provided for the purpose of calculating relative distances and bearings between ships, planes in flight and other remote objects relative to another object and plotting the calculations obtained rapidly and accurately.

When a number of ships are together they seldom all have radar in operation. It then becomes necessary for one ship on station, commonly termed the central station, to give out information regarding distances, bearings, number of planes, altitudes etc. Since the central station may vary from one to twenty miles distance from the ship to which the information is being transmitted, the bearings, courses and distances will not be the same from the flight to the ship as to the central station.

The determination of distances and positions of remote objects, particularly at sea, heretofore, has required considerable labor and time and often resulted in confused and inaccurate data. Expensive and complicated plotting devices have been provided but do not serve the purpose intended. Complicated mathematical computation is often required before the exact position of the remote object can be determined.

It is therefore the primary object of the present invention to provide an exceptionally simple manually operative calculating device that can be employed for locating the instantaneous position of remote objects relative to another remote object and to follow the movement or movements thereof in their course of travel toward the last mentioned object.

Another object of the present invention is to provide an elongated scale, graduated in any suitable manner, and to slidably position a marker thereon, and to associate the said scale and marker with a plurality of protractors, whereby the positions and distances of remote objects from another object can readily be determined.

A further object of the present invention is the provision of a course indicator onto the said scale, which indicator is revolvably positioned at one end portion thereof, whereby the course of movement of an object or a plurality of objects relative to another object can easily be followed.

A still further object of the pesent invention is the provision of a simple calculator of the character described that can be employed in the home or school room for solving practice problems and thereby train students and the like in the art of laying off courses, computing distances and correcting compass errors speedily and accurately.

Other objects and advantages will be apparent during the course of the following description.

In the accompanying drawings forming a part of the specification, wherein for the purpose of illustration like numerals designate like parts throughout the same, Fig. 1 is a top plan view of one form of a calculator embodying the invention, Fig. 2 is an end sectional view taken on line 2—2 of Fig. 1, shown on a horizontal plane, Fig. 3 is an end sectional view taken on line 3—3 of Fig. 1, the view being shown on a horizontal plane, Fig. 4 is a longitudinal view of the improved calculator, shown partly in elevation and partly in section, Fig. 5 is a top plan view of the calculator illustrating its operation for determining courses and distances, Fig. 6 is an enlarged top plan fragmentary view of the scale and a modified form of marker thereon, Fig. 7 is an end sectional view taken through the scale and marker on line 7—7 of Fig. 6, Fig. 8 is an enlarged top plan fragmentary view of the scale and a vernier that can be employed in the invention, Fig. 9 is an enlarged plan view of the course indicator, and Fig. 10 is a diagrammatic view of the angle shown in Fig. 5 and the unknown distance determined by the calculator and illustrating how the different distances are mathematically determined.

Referring in detail to the drawings and to the different parts thereof the numeral 21 designates, as a whole, an elongated scale which is preferably made of transparent material such as plastic and may be of any suitable length and graduated in any suitable manner and is preferably formed with beveled edges 22 and 23 as shown to advantage in Figs. 2 and 3. In the present illustration the scale is numerated from 1 to 20, inclusive, and the numbers are placed on one side of the scale as shown at 24 in Fig. 1 or on both sides of the same as shown at 24 and 25 in Fig. 5. A suitable marker 26, slotted as at 27 to conform with the shape of the scale is slidably mounted thereon as shown in Figs. 1 and 2.

The course indicator is designated as a whole by the numeral 28 and is preferably formed with a circular portion 29, having an arm 30 extending therefrom. A graduated disc 31 is revolvably mounted on the outer end portion of the said arm. The said disc 31 is provided to faciliate the manipulation by the finger tip of the large disc 29, shown to advantage in Figs. 5 and 9. The graduations in the large disc 31 are formed to provide a friction surface for the end of the finger and also for ornamental purposes. An indicating line 32 radially extends on the center of the said arm 30 and a slot 33 is formed through the arm as shown in Fig. 1. The numeral 34 designates a suitable protractor, the numeral 35 a reinforcing washer and the numeral 36 a fastening strip. A round opening 37 is concentrically formed through the course indicator and the said protractor and washer. A pair of suitable rivets 38 extend through the scale 21 and the said opening 37, at the outer periphery of the said opening and are secured to the strip 36, whereby the course indicator 28 and protractor 34 are revolvably supported onto the scale 21. The numeral 39 designates an aperture provided through the said scale 21 and the numeral 39' an aperture through the strip 36, the said apertures being concentric with the opening 37 provided in the protractor 34 and the circular portion 29 of the course indicator. The numeral 40 designates a plurality of small holes provided through the arm 30 of the course indicator.

A large protractor 41, and a smaller protractor 42 and a pointer 43 are revolvably secured together by a suitable pin 44, the bottom face of the marker being recessed as at 45 in Fig. 2 for accommodating the head of the pin, whereby the said protractors are centered in the marker. Likewise protractors 46 and 47 and a pointer 48 and a marker 48', shown to advantage in Fig. 5, are revolvably secured together by the pin 49, the said pointer being preferably provided and revolvably secured to the protractors to facilitate the reading of the angles.

In Figs. 5 and 10 there is shown to advantage an example indicating different relative positions of remote objects and illustrating how the improved calculator is operated to determine the unknown distances. The examples show three objects A, B and C, which objects can be a plurality of ships or a combination of ships an planes positioned at different remote locations. It will be assumed for example that A is the ship termed the central station, which ship is equipped with radar and various instruments for obtaining information regarding distances, bearings, etc., of other objects and giving out the same. The character B can be an enemy ship or a flight of enemy planes and C designates another ship receiving information from A regarding distance, bearing and traveling course of B. The distance A—B is known by A and for example is seven miles. The distance A—C is also known by A and for example is eighteen miles. The angle at A is also known which in the present instance is fifty two degrees. The distance B—C is unknown and it is that distance which constitutes one of the problems to be calculated.

In making the calculation the calculator is placed on a suitable drawing board or table upon which is provided a piece of plotting paper and the marker 26, connected to the protractors 41 and 42 is moved on the scale 21 to 7 as shown in Fig. 5 and in which position the pin 44 is fixed to the table. The larger protractor is set to a position designating true north and is aligned with the center line of the marker 26. A circle pencil mark is made on the paper through the hole 39 to establish the location of B and from which point the center line 32 of the course indicator arm radially extends. The angle at A formed by the line A—C relative to the line A—B is known by the central station A to be fifty two degrees. The said angle is marked off and the line A—C is then established and the ship's location C is obtained by measuring off 18 on the said line from the scale 21. By maintaining the center 38 of the course indicator and swinging the scale 21 to a position as shown in dotted lines in Fig. 5 and in which position the center line 50 on the said scale intersects the point C, it will be obvious that the correct distance from B to C will be automatically determined and readable on the scale 21, and the bearing of the ship's location C on protractor 34. In the present example the said distance is 14.785 miles and can be read accurately by the employment of a vernier such as illustrated in Fig. 8. The scale 21 and the course indicator are formed of transparent material, whereby the points of location can be readily observed through the same. The said scale can be of a considerable greater length than illustrated in the drawing and finely graduated in any suitable manner between the numbers thereon in order to assure accuracy.

In Fig. 10 there is shown for example, and computed mathematically, the same problem as that shown in Fig. 5 and automatically computed by the improved calculator. In order to properly solve the problem in the simplest manner it becomes necessary to divide the triangle as at D and in which case two right angle triangles are formed. Since the angle 52° is known and the angle of 90° established it follows that the angle at B is 38° to complete the triangle as the total sum of the angles of a triangle is always 180°. The sine of 38°×the hypotenuse 7=4.309, the distance E. The total distance 18 minus 4.309=13.690, establishing the leg F. Co-tangent of 38°×4.309=5.516, establishing the distance D. As the square of the hypotenuse of a triangle is equal to the sum of the squares of the two opposite sides it follows that the square root of the total sum of the square of F plus the square of D will equal the hypotenuse G which equals 14.785. From the foregoing description taken in conjunction with the accompanying drawing it will be apparent that the distance G and other distances can be determined in a lesser time and with much less difficulty with the improved calculator.

As the distance between the point B and the ship's location C has been determined it is also desirable to obtain the directional course or bearing angle that the plane or other objects are travelling from B relative to the ship's location C. As hereinbefore stated the course indicator protractor 34 has been aligned with the protractor 41 of the central station A designating true north and the bearing of the ship's location C has been determined. The direction a flight of planes travelling from B being known at the central station the course indicator arm 30 is adjusted to the said bearing known at the central stations as the bearing of the ship's location C has already been determined and is readable on the protractor 34 at the center line 50 on the scale 21 it is obvious that the bearing of the directional course of the said flight of planes relative to the bearing of the ship's location C is readable on the protractor 34 at line 32 on the course indicator arm 30. A pencil mark following the slot 33 is made to indicate the directional course the flight of planes at B are travelling relative to the ship's location C.

The distance from ship's location C to point H is measured on the scale 21 in the same manner as the distance from B to C. The set of protractor 46 and 47 are placed at the ship's location C and fixed thereto by the pin 49. The large protractor 46 is adjusted by placing the scale 21 over C and aligning 0 with the center line of the marker forming a right angle at C. A plane travelling from B on the line 32 indicated by the course indicator, at a certain speed would pass at right angles or astern the ship's location C, indicated at H, at a certain time, which distance can be readily measured at the correct time by the scale 21. Likewise, the elevation of a plane has an important bearing on distance if the elevation is great. Knowing the distance on surface and the elevation, at the central station, the line from the ship's location to the target forms a hypotenuse of a right angle triangle. By using protractor 34 to make a right angle the hypotenuse can be instantly measured by the scale 21. There are many other problems that can be readily calculated by the improved calculator in a similar manner.

It is to be understood that the forms of my invention herewith shown and described are to be taken as preferred examples of the same and that various changes relative to the shape, size, material and arrangement of parts may be resorted to without departing from the spirit of the invention or the scope of the subjoined claim.

Having thus described my invention, I claim:

A calculating device of the character described comprising an elongated transparent member having linear scale indicia thereon, a protractor made of transparent material revolvably mounted onto the said elongated member and concentrically positioned at zero thereon, a course indicating arm made of transparent material revolvably positioned onto the center of said protractor, and radially extending therefrom, a radially extending slot in said indicating arm, a transparent marker slidably mounted onto the said elongated member and capable of being moved to and from zero on the linear scale, and a second protractor concentrically positioned onto the said marker and revolvably supported thereon.

WALTER BAUMGARTNER.

REFERENCES CITED

The following references are of record in the file of this patent:

UNITED STATES PATENTS

| Number | Name | Date |
| --- | --- | --- |
| 364,630 | Bowyer | June 14, 1887 |
| 662,977 | Schmelz | Dec. 4, 1900 |
| 1,802,603 | Herm | Apr. 28, 1931 |
| 1,828,807 | Kennedy | Oct. 27, 1931 |
| 1,917,282 | Woodside | July 11, 1933 |